United States Patent [19]
DeMartelaere et al.
[11] Patent Number: 4,845,998
[45] Date of Patent: Jul. 11, 1989

[54] APPARATUS FOR PRECISION TENSIONING OF THREADED FASTENERS

[75] Inventors: David L. DeMartelaere, Romeo; Craig B. Lindquist, Goodrich, both of Mich.

[73] Assignee: Kent-Moore Corporation, Warren, Mich.

[21] Appl. No.: 150,756

[22] Filed: Feb. 1, 1988

[51] Int. Cl.[4] .......... G01L 5/24

[52] U.S. Cl. .......... 73/862.23; 73/761; 73/862.35

[58] Field of Search .......... 73/761, 862.21, 862.23, 73/862.35; 364/506, 508

[56] References Cited

U.S. PATENT DOCUMENTS 3,962,910 6/1976 Spyridakis et al. .......... 73/761
4,091,451 5/1978 Weiner et al. .......... 73/862.23 X
4,125,016 11/1978 Lehoczky et al. .......... 73/862.23
4,259,869 4/1981 Carlin .......... 73/761
4,608,872 9/1986 Mayer et al. .......... 73/862.23

*Primary Examiner*—Charles A. Ruehl
*Attorney, Agent, or Firm*—Barnes, Kisselle, Raisch, Choate, Whittemore & Hulbert

[57] ABSTRACT

Apparatus for precision tensioning of threaded fasteners and the like comprising a drive head having a shaft for applying turning torque to a threaded fastener, a strain gage mounted on the drive shaft for providing a torque signal as a function of torque applied to the fastener, and an optical encoder for providing an angle signal as a function of angle of rotation of the fastener. An electronics package includes a microprocessor-based controller, an alphanumeric display for displaying either torque or angle as well as additional operating mode information, and a membrane switch panel for operator selection of angle-monitoring mode, torque-monitoring mode, measurement or setup operating modes, torque display in Newton-meters or foot-pounds, and for programming desired torque and/or angle thresholds into the control microprocessor.

35 Claims, 4 Drawing Sheets

FIG. 3
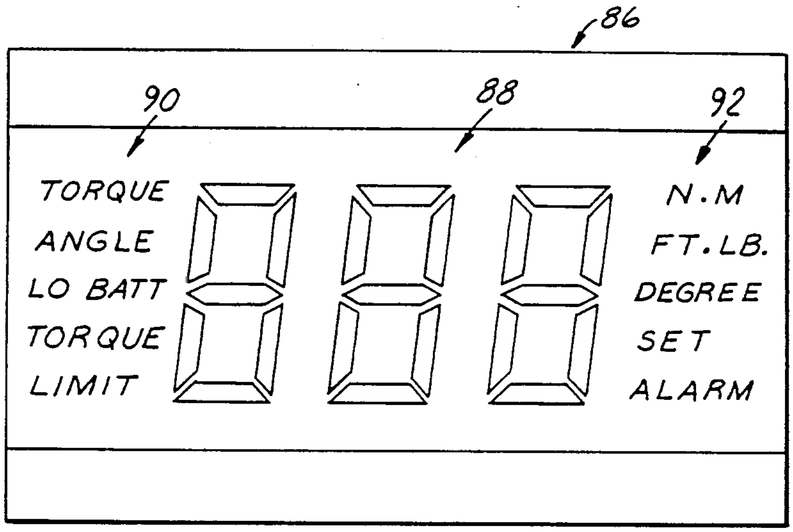
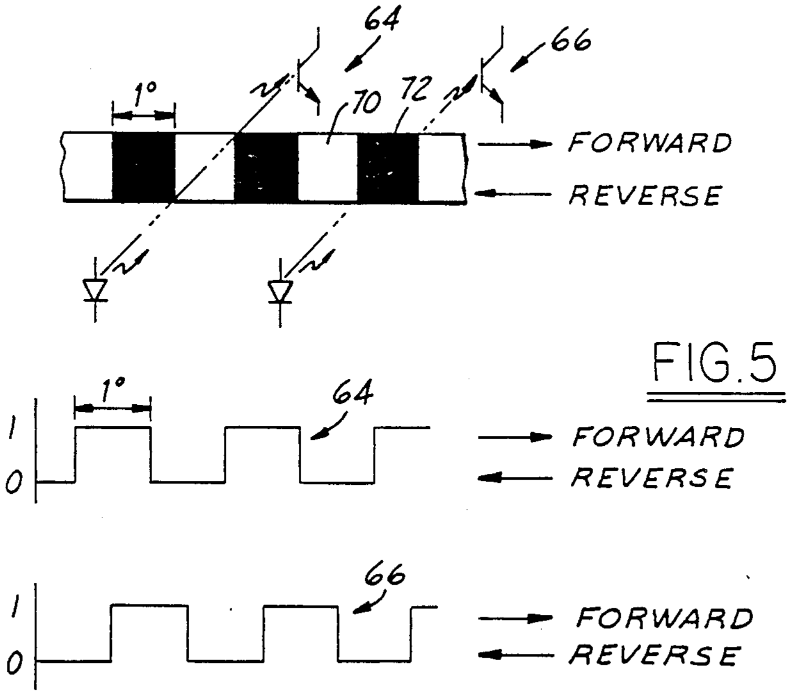
FIG. 5

APPARATUS FOR PRECISION TENSIONING OF THREADED FASTENERS

The present invention is directed to precision tensioning or preloading of threaded fasteners in critical assembly operations, and more particularly to an apparatus for monitoring and controlling the fastener tensioning operation as a function of torque applied to the fastener and angle of rotation of the fastener into the assembly structure.

BACKGROUND AND OBJECTS OF THE INVENTION

The importance of accurately and consistently controlling tension or preload applied to threaded fasteners increases with precision or criticality of parameters and tolerances of the assembly as a whole. This is particularly true in mass production of precision-designed equipment which may later be subjected to maintenance or repair, following which load applied to the assembly fasteners must be substantially the same as that applied during original manufacture. For example, in manufacture of internal combustion engines designed for high performance and fuel economy, the head is fastened to the engine block with a plurality of bolts prior to final machining of various block/cylinder critical surfaces. In the event that the head is later removed for repair or replacement, it is important that the same be precisely reassembled to the block so as to restore relationships of critical surfaces obtained during the original manufacturing machining operations.

Conventionally, preloading of threaded fasteners in engine and other assembly applications is controlled by monitoring torque applied to the assembly tool, such as with a mechanical or electrical torque wrench. Fastener preload control through monitoring of fastener torque alone, however, yields unpredictable and inconsistent results due in part to varying friction between the mating threads and beneath the fastener head. Where it has been attempted to obtain greater uniformity through use of lubricants or the like, results have continued to be unsatisfactory. Another approach has been to monitor torque as a function of angle of rotation, determine rate of change of torque, and compare the resulting data during the manufacturing operation to empirically determine data prestored in a computer memory. Such arrangements still do not directly measure fastener tension, and in addition require expensive assembly and control hardware. A third approach has been to tighten the fastener to a point at which the fastener material yields and the fastener head separates from the threaded body. Arrangements of this type suffer from the same inherent drawbacks as the torque wrench technique described above due to varying friction between the fastener and the assembly, and also increases the cost of both manufacture and repair due to requirement for special double-headed fasteners. For a general discussion of conventional techniques for monitoring and controlling pretensioning of threaded fasteners, see Kelly, "Electronic Controls Zero-In On Reliable Fastening," *Assembly Engineering,* November 1986, pages 34–38.

A further technique for controlling fastener preload has been found to yield particularly consistent results. This technique, termed "torque-turn" or "torque-angle," involves initially tightening the fastener to a specified torque, and thereafter tightening the fastener through an additional prespecified angle. The initial tightening torque is empirically predetermined to be one at which the fastener is tightened in assembly but has not yet been substantially elastically stretched. By thereafter tightening the fastener through an additional angle or fraction of a turn, advantage is taken of the precision machining of the fastener threads so as to obtain a predetermined elastic stretching of the fastener within the assembly. For example, a torque-turn or torque-angle fastening specification ma call for initial tightening to a torque of 25 Newton-meters, followed by an additional one-half turn or 180° rotation in three equal steps. Computer-based equipment has been proposed for implementing such fastener preloading technique in mass production operations. However, as previously noted, control during maintenance and repair is as important as control during original assembly, and there remains a need in the art for inexpensive equipment which may be employed by maintenance and repair technicians in the field for obtaining the same precision control of fastener preloading as is done during the original manufacturing operation. A general object of the present invention is to provide apparatus of such a character.

SUMMARY OF THE INVENTION

Apparatus for precision tensioning of threaded fasteners in accordance with a presently preferred embodiment of the invention comprises a fastener drive head coupled by a multiconductor cable to an apparatus electronic control and display enclosure. The drive head includes a shaft with hex drive and socket mounting facility for applying turning torque to a threaded fastener. A strain gage is mounted on the fastener drive shaft for providing a torque signal as a function of torque applied through the shaft to a fastener. An angle transducer, specifically an optical encoder, is coupled to the fastener drive shaft for measuring angle of rotation of the shaft and fastener, and for providing an angle signal as a function thereof. In the preferred embodiment of the invention, the drive head comprises a two-section housing, one section being affixed to the fastener drive shaft and the other being rotatable with respect thereto. The encoder comprises an annular band carried by one of the housing sections, specifically the housing section which is rotatable with respect to the drive shaft, and having alternating translucent and opaque zones at predetermined angular increments surrounding the fastener drive shaft axis of rotation. Two optical couplers are carried by the other housing section and are spaced from each other circumferentially of the shaft axis by the angle $Ni/2$, where $N$ is an odd integer and $i$ is the incremental angle of the encoder band zones.

The electronic enclosure package includes circuitry, preferably microprocessor-based circuitry, for receiving and integrating the angle signal fed thereto from the sensor head through the multiconductor cable to accumulate total angle of rotation of the fastener. The control circuitry also monitors the torque signal fed to the electronics from the sensor head. The microprocessor-based control circuitry preferably includes facility for establishing selected torque and/or angle thresholds, comparing each of the torque and angle signals to the corresponding threshold, and indicating when one of the signals equals the corresponding threshold. The torque and angle thresholds are programmable by an operator.

The electronics enclosure includes an operator control panel having an alphanumeric display and facility for selecting either a torque-monitoring mode of operation or an angle-monitoring mode of operation. The operator panel also includes facility for selecting either a measurement mode of operation or a setup mode of operation. During a torque-monitoring mode of operation, either the torque signal received from the drive head or the torque threshold set by the operator is shown at the alphanumeric display depending upon whether a measurement or setup mode of operation is selected. Likewise, during an angle-monitoring mode of operation, accumulated angle of rotation at the sensor head or the angle accumulation threshold is shown at the display depending upon whether a measurement or setup mode of operation is selected. During the setup mode of operation, either of the torque and angle thresholds may be selectively incremented or decremented through operation of switches on the enclosure operation panel. During the angle-monitoring mode of operation, the accumulated angle of rotation may be reset to zero through operation of a switch on the enclosure panel or on the sensor head. The various panel switches preferably comprise membrane switches bearing suitable indicia for indicating function thereof. The angle-monitoring circuitry within the control electronics also includes facility responsive to the two optical couplers in the sensor head encoder for determining not only angle of rotation but also direction of rotation of the fastener drive shaft.

BRIEF DESCRIPTION OF THE DRAWINGS

The invention, together with additional objects, features and advantages thereof, will be best understood from the following description, the appended claims and the accompanying drawings in which:

FIG. 3 is an enlarged view of the apparatus alphanumeric display on the electronic enclosure package of FIG. 1;

FIG. 5 is a schematic drawing illustrating operation of the angle encoder optics and electronics.

DETAILED DESCRIPTION OF PREFERRED EMBODIMENT

Figure 1:
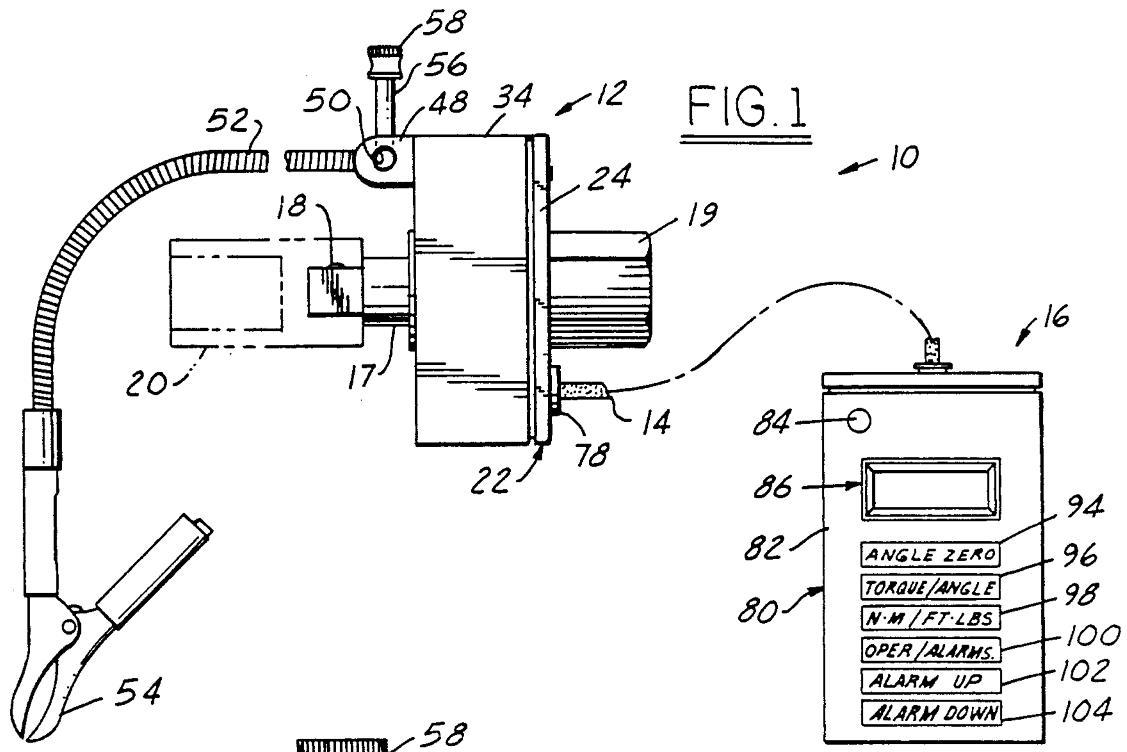
FIG. 1 is a fragmentary plan view of apparatus for precision tensioning of threaded fasteners in accordance with a presently preferred embodiment of the invention.

FIG. 1 illustrates apparatus 10 for precision tensioning of threaded fasteners in accordance with a presently preferred embodiment of the invention as comprising a fastener drive head assembly 12 coupled by a multiconductor cable 14 to an electronics enclosure 16. Drive head 12 is illustrated in greater detail in FIG. 2 and includes a fastener drive shaft 17 having at one end a hex head 19 for engagement with a suitable wrench or the like, and a detent assembly 18 of suitable conventional construction at the opposing shaft end for removably receiving and mounting a fastener drive socket 20 of desired size and contour. A two-section housing 22 is carried by shaft 17. Housing 22 comprises a generally flat base 24 having a stepped central aperture 26 received over shaft 17 and engaging head 19, so that base 24 is effectively held by aperture 26 and head 19 against rotation with respect to shaft 17. Base 24 is fastened in position by a spring clip 28. A printed circuit-board assembly 30 is mounted within housing 22 on a ledge 32 which is upstanding from base 24.

Housing 22 also includes a cup-shaped shell 34 having a base 36 with a central aperture 38 received over shaft 17 and captured thereon between a shoulder 40 and a grip ring 42. Shell 34 is thus free to rotate about shaft 17 while being constrained by shoulder 40 and grip ring 42 from axial motion with respect thereto. Shell 34 has a cylindrical sidewall 44 which extends as a flange from the periphery of base 36 to a position adjacent to the periphery of base 24, and overlies a cylindrical flange 46 which projects inwardly from base 24 toward shell 34. Wall 44 and flange 46 are positioned closely adjacent to each other in assembly so as to effectively enclose the hollow interior of housing 22 while permitting rotation of shell 34 about the axis of shaft 17 with respect to base 24. An eyelet 48 having a central aperture 50 is affixed to shell base 36 adjacent to the periphery thereof. A flexible cable 52 is slidably received within aperture 50 and has a "hippo clip" or the like 54 fastened to the opposing end thereof. A setscrew 56 having a knurled head 58 is received within eyelet 48 for selectively engaging cable 52 within aperture 50 and thereby clamping the cable in position with respect to housing shell 34.

Figure 2:
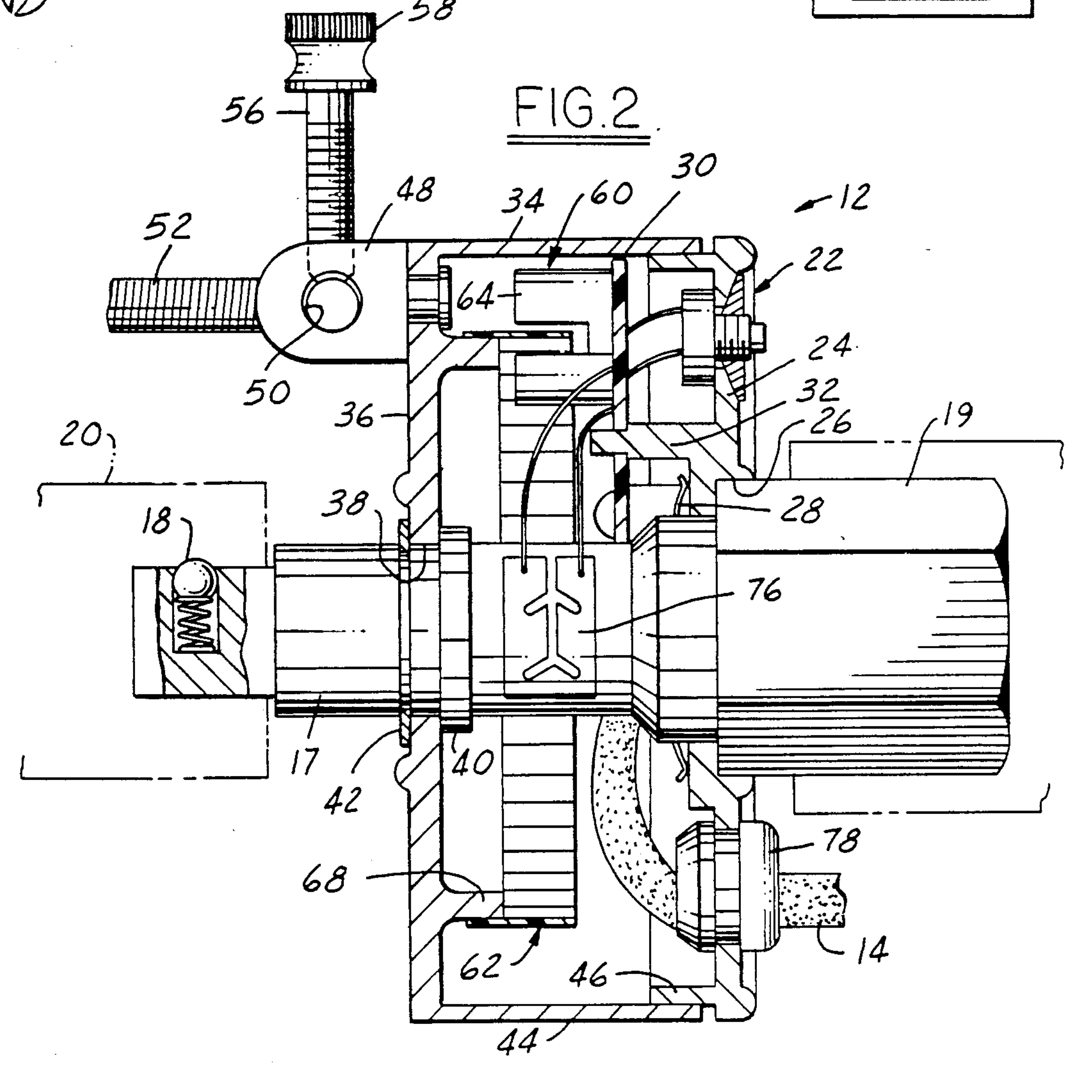
FIG. 2 is an enlarged sectional view of the drive head assembly illustrated in FIG. 1.
Figure 4A:
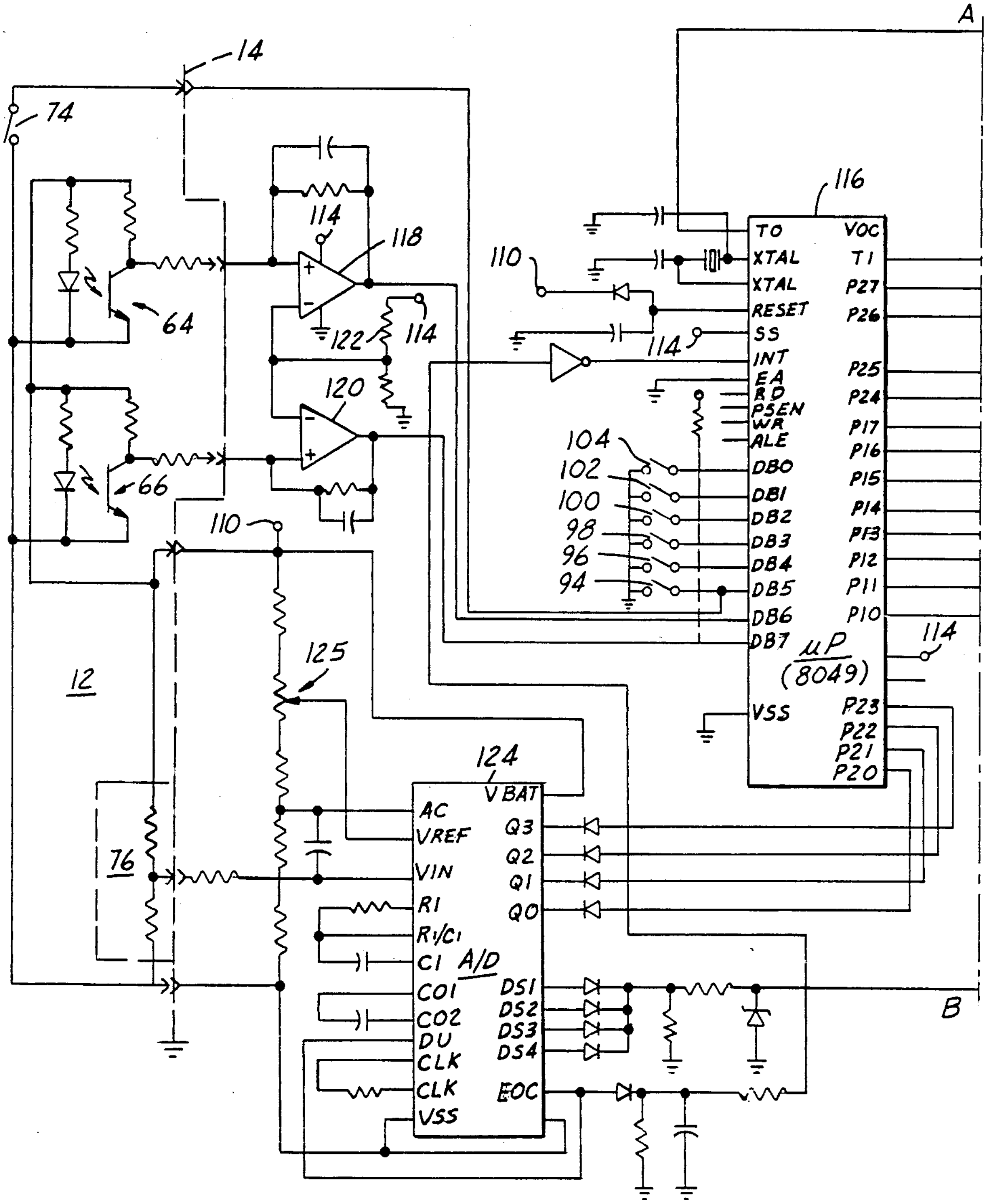
FIGS. 4A–4B together comprise an electrical schematic diagram of control electronics contained within the electronic enclosure package of FIG. 1, FIGS. 4A and 4B being interconnected along the line A–B in each figure.

An optical encoder 60 is mounted within housing 22 and comprises an encoder wheel 62 and a pair of optical detectors 64,66 (FIGS. 2, 4A and 5). Wheel 62 in the preferred embodiment of the invention takes the form of a band or strip of suitable plastic construction coiled on edge in a hoop and fastened to a lip 68 on shell base 36 circumferentially surrounding and coaxial with fastener drive shaft 17. As best seen in FIG. 5, strip 62 has translucent and opaque zones 70, 72 which alternate in a uniformly spaced circumferential array around shaft 17 at predetermined angular increments—e.g., one degree increments in the preferred embodiment of the invention. Optical couplers 64, 66, which are of suitable conventional construction, are mounted on circuit board 30 and receive band 62 for detecting zones 70, 72 as band 62 rotates therethrough. Couplers 64, 66 are spaced from each other circumferentially of shaft 17 by an odd multiple of angular increments plus or minus $\frac{1}{2}$increment—i.e., by the angle Ni/2 where N is an odd integer and i is angular increment or length of zones 70, 72 on strip 62. The significance of such spacing will become apparent hereinafter. A pushbutton 74 is carried by base 24 and has conductors coupled to circuitboard 30. A strain gage 76 is mounted on shaft 17 within housing 22 and has conductors extending therefrom to circuitboard 30. Couplers 64, 66, pushbutton 74 and strain gage 76 are connected by circuitboard 30 to cable 14 which extends through a strain relief grommet 78 on base 24 to electronics enclosure 16 (FIG. 1). Strain gage 76 may be of any suitable conventional type for providing an electrical output signal as a function of strain applied thereto, which in turn is a function of the torque applied to shaft 17 against a fastener whose head is received within socket 20. In a working embodiment of the invention, strain gage 76 comprises a type 6/350XY21 strain gage marketed by H.B. Electronics modified by the manufacturer to have a nominal series resistance of 700 ohms.

Figure 4B:
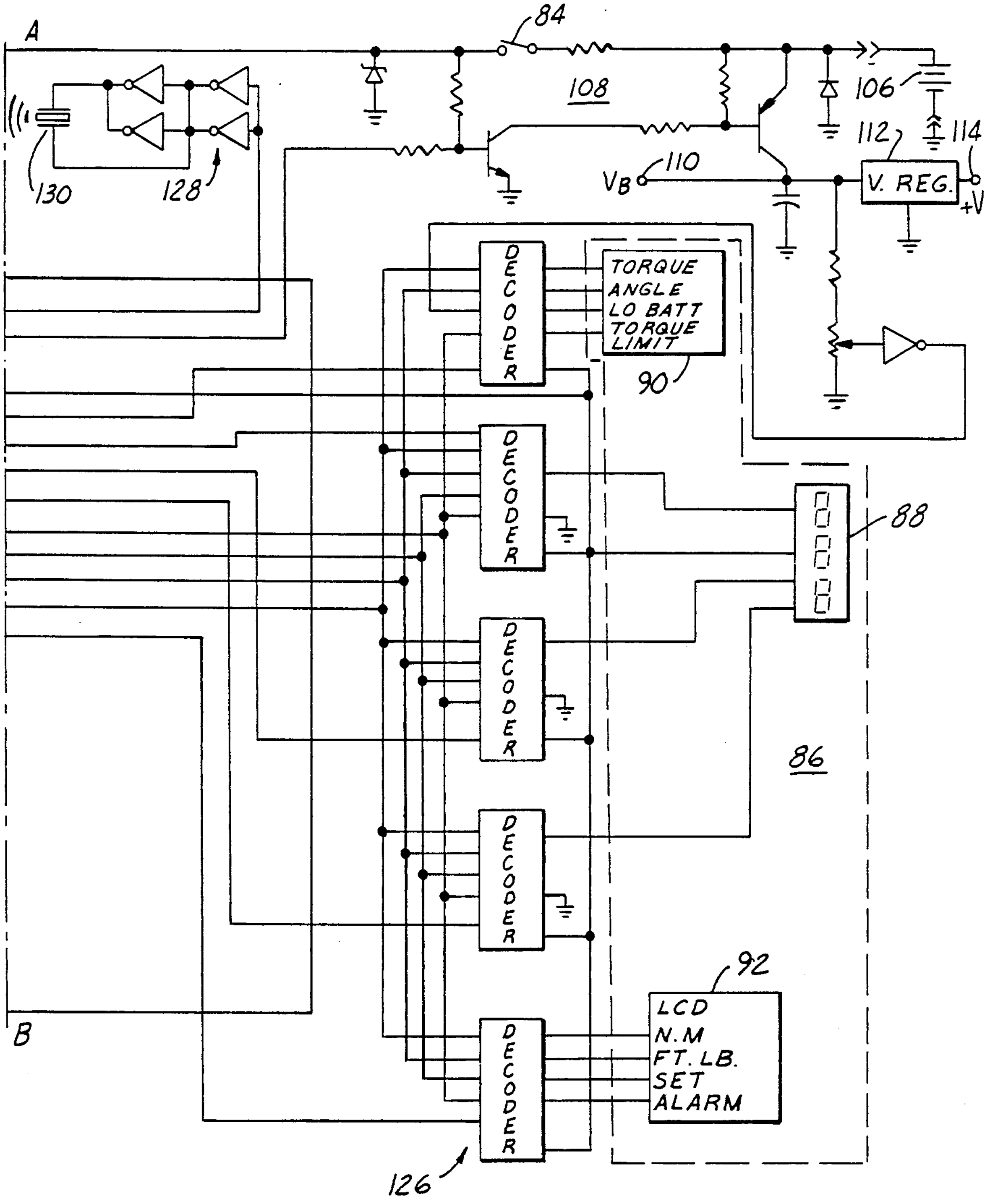

Electronics package 16 (FIG. 1) includes an enclosure 80 having a front or operator panel 82. An on/off pushbutton toggle switch 84 is carried on panel 82 above a multiple-character alphanumeric display 86 (FIGS. 1, 3 and 4B). Display 86 includes three centrally positioned 7-segment alphanumeric characters 88 (FIGS. 3 and 4B) for displaying angle, torque and other information. In addition, display 86 includes indicators 90 along the left edge of numeric display 88 for indicating a TORQUE-monitoring mode of operation, an ANGLE-monitoring mode of operation, a LO BATTery condition, and a TORQUE LIMIT setup mode of operation. Likewise, indicators 92 are arrayed along the right-hand edge of numeric display 88 for indicating display of torque in N·M or FT·LB, display of angle of rotation in DEGREEs, threshold SETup mode of operation, and an ALARM condition.

Returning to FIG. 1, six rectangular membrane switches 94–104 are arrayed in sequence beneath display 86 on panel 82. Each switch 94–104 bears indicia for indicating function thereof. ANGLE ZERO switch 94 selectively resets to zero the angle of rotation accumulated within the control electronics. TORQUE/ANGLE switch 96 is for selecting between torque-monitoring and angle-monitoring modes of operation. N·M/FT·LBS switch 98 is for selecting between numeric display of torque in Newton-meters and foot-pounds. OPERATE/ALARM SET switch 100 selects between the normal or measurement operating mode of operation, and the alarm or threshold setup mode of operation. ALARM UP and ALARM DOWN switches 102–104 are for selectively incrementing and decrementing the angle or torque thresholds indicated at display 86 during a setup mode of operation.

FIGS. 4A and 4B together comprise an electrical schematic diagram of apparatus 10, including both electronics carried within drive head 12 (FIG. 4A) and electronics carried within enclosure 80 (FIGS. 4A and 4B). Apparatus electronics are powered by a battery 106 (FIG. 4B) which is carried within enclosure 16. Battery 106 is connected through operator switch 84 (FIGS. 1 and 4B) and through an electronic power switch 108 to a battery voltage bus 110. A regulated voltage bus 114 is connected to bus 110 by a voltage regulator 112. A microprocessor 116 (FIG. 4A), such as an 8049 microprocessor having on-board memory, has data inputs DB0–DB5 connected in reverse order to switches 94–104. Switch 74 at drive head 12 is connected by cable 14 to input DB5 in parallel with switch 94. Optical coupler 64 on head 12 is connected through cable 14 to the non-inverting input of a differential amplifier 118. Likewise, optical coupler 66 is connected by cable 14 to the non-inverting input of a differential amplifier 120. The biassing resistors for couplers 64, 66, illustrated schematically in FIG. 4A, are carried by a circuitboard 30 (FIG. 2) within head 12. The inverting reference inputs of amplifiers 118, 120 are connected to a voltage divider 122, and the amplifier outputs are respectively connected to the DB6 and DB7 data inputs of microprocessor 116. Strain gage 76 on head 12 is connected by cable 14 to the signal input of a A/D converter 124, which provides a digital output to ports P20–P23 of microprocessor 116 as a function of analog input thereto from strain gage 76. The reference input to converter 124 is connected to a factory-adjustable voltage divider 125 across bus 110.

Microprocessor ports P10–P17 and P24–P25 are connected to display 86 through a series of decoders 126. A battery voltage monitor, including a factory-adjustable voltage divider 127 connected to bus 110, and an inverter 129, drives the LO BATTery indicator of display segment 90 through a decoder 126. Display 86 preferably comprises a custom LCD to display information as illustrated in FIG. 3 and described hereinabove. Microprocessor port P27 is connected through an oscillator 128 to an audible alarm 130 for "beeping" preprogrammed alarm conditions to an operator through a suitable aperture or vent (not shown) in enclosure 80 (FIG. 1). Microprocessor port P26 is connected to power switch 108 for removing battery power from the operating and display electronics in the event of non-use for an extended time, and thereby conserving battery power during standby. The T0 port of microprocessor 116 is connected to switch 84, and the T1 port is connected to the control inputs of A/D convertor 124. Power is supplied to sensor head 12 from battery power bus 110 and cable 14.

In operation, with switch 84 initially closed and battery power supply to the control electronics, an operator may first set or program the torque and angle thresholds within microprocessor 116. This is accomplished by activating switch 110 until SETup mode of operation is indicated at display segment 92, and then selecting either TORQUE or ANGLE monitoring mode of operation at display segment 90 through depression of switch 96. In a torque setup mode of operation, for example, switches 102, 104 are depressed as required to increment or decrement the threshold stored during previous use of the instrument in one Newton-meter or one foot-pound increments to the desired torque limit, such as 50 Newton-meters for example. Operation is then switched to angle mode by depressing switch 96, and switches 102, 104 are again depressed as required to increment or decrement the previously-stored angle threshold in one degree increments to the desired level, such as 180° for example. With the instrument then ready for operation, switch 100 is depressed to change from the setup mode of operation to the measurement mode of operation.

Head 12 and electronics package 116 are then positioned as desired in order to tighten the selected fastener. A suitable socket 20 is fastened to head 12 and the head is positioned over the fastener. Clip 54 is then affixed at suitable position on the assembly into which the fastener is to be tightened so as to prevent rotation of head segment 34 as the fastener is tightened, and setscrew 56 is turned to clamp cable 52 in position. With head 12 so positioned, and in accordance with a preferred technique for utilizing the invention, the operating electronics are placed in a torque-monitoring mode of operation by depression of switch 96 and observation of display segment 90, a suitable drive mechanism is positioned over drive head 19, and the fastener is driven into the assembly. When the fastener is driven into the assembly to the previously-set torque threshold—e.g., 50 Newton-meters in the example discussed above—the operator is so advised by energization of audible alarm 130. Thus, the operator need not continuously observe display 86 in order to be advised that the fastener torque has reached the desired threshold level. In order to complete the torque/angle fastener preload procedure for which the present invention is particularly useful, the operator then depresses switch 96 to switch to an angle mode of operation, and then resets the angle accumulation to zero by depression of either switch 94 on enclosure 80 or switch 74 on drive head 12. The operator then continues to turn the fastener into the assembly for the specified number of degrees or fraction of rotation previously stored in the control electronics—e.g., 180° in the example discussed above—at which point alarm 130 is again activated by microprocessor 116 to advise the operator that the fastener angle threshold has been reached.

In normal operation, it is anticipated that a number of fasteners will be tightened into an assembly in a predefined sequence. For example, eight bolts affixing a head to an engine block may be tightened in a predetermined sequence to the torque threshold, and thereafter further tightened in the same or differing sequence to the angle threshold. In this situation, the apparatus of the invention would be operated in the torque-monitoring mode during the initial tightening sequence, and thereafter switched to the angle-monitoring mode during the latter portion of the tightening sequence. Most preferably, a maximum torque limit such as 266 Newton-meters (200 foot-pounds) is preprogrammed into the control electronics and audible alarm 130 is continuously activated if such maximum torque limit is exceeded in any mode of operation.

During the angle-monitoring mode of operation, optical pickups 64, 66 cooperate with zones 70, 72 on strip 62 for indicating to control microprocessor 116 not only degrees of rotation but also direction of rotation of drive shaft 14 and the driven fastener. Thus, if the fastener is turned in the reverse direction during the angle-monitoring mode, the total accumulated angle will be decremented rather than incremented. Referring to FIG. 5, placement of optical couplers 64, 66 as described above ensures that the outputs thereof are, in effect, 90° out of phase with each other. Assuming that band 62 is travelling in the "forward" direction indicated in FIG. 5, each time the output of coupler 64 switches from a logical zero to logical one, the output of coupler 66 is at a low or logical zero state. Likewise, on each transition of the output of coupler 66 from a logical zero to a logical one, the output of coupler 64 is at a high level. However, when band 62 is travelling in the opposite or "reverse" direction, the output of coupler 66 is at a high or logical one state upon each positive transition of coupler 64, and the output of coupler 64 is at a high or logical one state at each positive transition of coupler 66. By examining the state of one coupler output upon positive (or negative) transition at the other, microprocessor 116 can thus readily determine direction of rotation of band 62 within head 12.

A complete program listing for operating an 8049 type microprocessor in the manner described above accompanies this application as an Appendix.

APPENDIX

```
000  04 0A 00 E5 94 02 00 E5 84 3F 35 15 23 4F 3A C5   ...e...e.?5.#O:E
010  B8 18 B9 3C B0 00 18 E9 14 D5 BD 10 BB 05 B9 39   8.9<0..i.U=.;.99
020  C5 74 A8 B8 3D B0 00 A5 B8 2A B0 08 C8 B0 88 B8   Et(8=0.%8*0.HO.8
030  2A 14 9A BE FF 94 FB 74 2D B9 0F B8 3D F0 C6 3B   *..>..{t-9.8=pF;
040  B0 00 E9 3B 74 29 34 ED B8 27 74 88 B8 28 FB A0   0.i;t)4m8't.8({
050  B8 2F B0 00 08 B8 32 A0 B8 25 B0 00 B9 20 B1 00   8/0..82 8%0.9 1.
060  27 D5 AE C5 B9 24 B1 00 B4 D7 37 12 71 32 71 A4   'U.E9$1.4W7.q2q$
070  10 23 1D 34 0E 94 AC 23 03 34 19 B8 25 F0 92 86   .#.4..,#.4.8%p..
080  52 84 04 F6 04 EE 52 E6 04 CC 00 02 08 0A 10 12   R..v.nRf.L......
090  18 1A 04 06 0C 03 8A A3 39 83 99 00 F0 53 0F 85   .......#9...pS..
0A0  14 C3 14 95 89 80 99 1E C8 F0 47 53 0F 14 C3 14   .C......HpGS..C.
0B0  95 89 40 99 1E F0 53 0F 14 95 89 20 99 1E 99 00   ..@..pS.... ....
0C0  18 84 B5 B6 CB 95 96 CB 95 23 0A 83 34 54 54 2B   ..56K..K.#..4TT+
0D0  B8 2E 14 9A 54 2B B8 2E 74 8F B8 31 34 24 54 2B   8...T+8.t.814$T+
0E0  54 6F C6 CC 04 71 BF 01 B8 33 B0 31 24 8E BF 00   ToFL.q?.8301$.?.
0F0  B8 33 B0 2C 24 8E 34 54 B8 2A 74 3D B8 2A 74 8F   830,$.4T8*t=8*t.
100  B8 2C 34 24 74 07 54 6F 96 0C 04 F6 04 71 B9 21   8,4$t.To...v.q9!
110  37 51 A1 83 B9 21 41 A1 83 B9 20 37 51 A1 83 B9   7Q!.9!A!.9 7Q!.9
120  20 41 A1 83 54 13 85 C6 2A 95 F0 96 37 C8 F0 96    A!.T..F*.p.7Hp.
130  37 23 0D 34 14 24 42 B6 47 B9 25 F1 92 53 23 0D   7#.4.$B6G9%q.S#.
140  34 0E 23 02 34 19 83 23 09 34 14 23 04 34 0E 23   4.#.4..#.4.#.4.#
150  02 34 1F 83 B8 3D F0 C6 7D B0 00 34 7E 54 2B B8   .4..8=pF}0.4~T+8
160  2A F0 53 0F A0 23 66 BA 02 54 13 23 01 E6 77 34   *pS. #f:.T.#.fw4
170  1F 23 10 34 14 24 7D 34 19 23 10 34 0E 83 34 ED   .#.4.$}4.#.4..4m
180  B8 2A 74 88 54 2B 64 5F B8 33 F0 A8 64 3D 23 03   8*t.T+d_83p(d=#.
190  34 19 34 88 54 6F C6 9A 04 71 B8 23 B0 00 54 2B   4.4.ToF..q8#0.T+
1A0  54 6F C6 A6 04 71 08 37 53 03 96 AE 04 71 AB C6   ToF&.q.7S....q+F
1B0  94 74 2D 34 D1 96 94 94 AC BD 23 24 C1 74 29 BD   .t-4Q...,=#$At)=
1C0  03 B8 33 F0 A8 74 B4 74 3D 34 D1 96 94 ED C9 24   .83p(t4t=4Q..mI$
1D0  BD BC 23 BE 00 54 2B 08 37 53 03 DB 96 E1 1E 54   =<#>.T+.7S.[.a.T
1E0  2B EC D5 FE 53 F0 96 EB 27 FF 83 27 83 B8 39 F0   +lU~Sp.k#..'.89p
1F0  53 0F AB 18 F0 53 0F AA 18 F0 53 0F 47 A9 18 F0   S.+.pS.*.pS.G).p
200  53 0F 49 83 C8 37 60 54 26 37 18 2A 37 70 54 26   S.I.H7`T&7.*7pT&
210  37 2A 83 2A 53 0F 2A 54 04 E6 20 96 23 2A 96 23   7*.*S.*T.f .#*.#
220  23 FF 83 23 00 83 A9 27 57 69 93 08 85 F2 30 95   #..#..)'Wi...r0.
230  B9 32 21 D2 36 95 D1 53 40 C6 64 B8 3F B0 01 54   92!R6.QS@Fd8?0.T
240  65 96 4B B1 00 B6 49 B1 FF 44 4B F1 C6 4F 95 23   e.K1.6I1.DKqFO.#
250  00 B6 55 23 FF B8 2E 74 AE F0 96 64 C8 F0 96 64   .6U#.8.t.p.dHp.d
260  B9 2F B1 00 83 B9 2F B8 2E F0 96 6E C8 F0 83 94   9/1..9/8.p.nHp..
```

```
270  83 08 37 AC 53 3F C6 7A 94 AC FC 53 3C AC B8 25   ..7,S?Fz..!S<,8%
280  F0 53 14 D3 10 C6 8B 23 1C 5C AC F0 37 92 93 23   pS.S.F.#.\,p7..#
290  F7 5C AC FC C6 9C 23 04 34 1F 44 A0 23 04 34 19   w\,!F.#.4.D #.4.
2A0  74 19 FC 37 B2 B0 74 07 23 0D 34 0E 23 02 34 19   t.!720t.#.4.#.4.
2B0  B9 24 F1 96 E9 FC BC 04 52 C9 BC 08 72 C9 BC 10   9$q.i!<.RI<.rI<.
2C0  92 C9 BC 20 B2 C9 23 00 83 BD 40 BE 00 08 5C 96   .I< 2I#..=@>..\.
2D0  D2 1E 54 2B ED CD FE 53 E0 96 DE 23 00 83 B9 24   R.T+mM~S`.^#..9$
2E0  FC A1 B8 25 D0 A0 23 FF 63 54 2B BD 0A 08 B9 24   !!8%P #..T+=..9$
2F0  51 C6 FD ED ED B1 00 23 04 34 19 23 00 83 C8 60   QF}mm1.#.4.#..H`
300  57 18 2A 70 57 2A 83 B8 2E B0 00 C8 B0 00 B8 2F   W.*pW*.8.0.H0.8/
310  B0 00 83 00 00 00 00 00 00 B8 20 F0 53 0F 96 23   0........8 pS..#
320  27 64 25 23 80 D5 AE C5 83 23 00 64 2F 23 80 D5   'd%#.U.E.#.d/#.U
330  AE C5 83 00 00 00 00 00 00 00 00 00 00 B9 25 F1   .E...........9%q
340  92 52 37 72 52 B9 34 F8 A1 94 0A 14 9A B9 34 F1   .R7rR94x!....94q
350  A8 83 14 9A 83 00 00 00 00 00 00 00 00 00 00 B9   (..............9
360  28 F1 DB 52 7D B8 27 74 8F B8 2A 54 04 F6 71 64   (q[R}8't.8*T.vqd
370  85 B8 27 74 8F B8 2A 74 96 54 04 64 85 B8 27 74   .8't.8*t.T.d.8't
380  8F B8 2A 54 FE 74 88 83 C8 A0 18 2A A0 2A 83 C8   .8*T~t..H .* *.H
390  F0 18 2A F0 2A 83 C8 20 18 2A 20 2A 83 99 00 89   p.*p*.H .* *....
3A0  0C 89 E0 99 1F 99 00 83 23 FF 62 25 45 83 BA 01   ..`.....#.b%E.:.
3B0  BF FF 64 C1 BA 01 64 BC BA 0A 64 BC B9 25 F1 AF   ?.dA:.d<:.d<9%q/
3C0  FB 12 E2 FA BA 00 54 FE 74 88 FF 92 D3 BA 02 23   {.bz:.T~t...S:.#
3D0  66 64 D7 BA 03 23 60 54 04 E6 E1 BA 00 23 00 74   fdW:.#`T.fa:.#.t
3E0  88 83 FA BA 00 74 96 54 04 E6 F8 FF 92 F4 BA 02   ..z:.t.T.fx..t:.
3F0  23 66 64 F8 BA 03 23 60 74 88 83 00 00 00 00 00   #fdx:.#`t.......
400  00 00 A5 B5 D5 BB 04 B9 39 93 74 8F B8 38 74 88   ..%5U:.99.t.88t.
410  BA 01 23 33 74 96 94 33 B9 36 2F A1 2F 94 71 94   :.#3t..396/!/.q.
420  33 B9 35 2F 47 A1 2F 94 71 94 33 B9 35 2F 41 A1   395/G!/.q.395/A!
430  B8 36 83 BF 00 84 38 1F 54 04 E6 37 54 FE 83 D5   86.?..8.T.f7T~.U
440  AC 76 47 B5 86 47 A5 0A DE 43 0F 3A ED 55 BD 10   ,vG5.G%.^C.:mU=.
450  B8 3E 10 D3 20 3A 76 5A 84 6A EB 67 A5 BB 05 B9   8>.S :vZ.jkg%:.9
460  39 B8 3D B0 FF 84 6A 0A A1 19 23 FF 62 25 45 FC   98=0..j.!.#.b%E!
470  93 AF 53 F0 4A 47 AA FF 53 0F 47 83 00 00 00 00   ./SpJG*.S.G.....
480  00 00 00 36 A2 B8 3E F0 53 80 B8 3F 20 12 AC D0   ...6"8>pS.8? .,P
490  F2 93 83 B8 41 BA 00 23 01 74 96 54 04 74 88 F6   r..8A:.#.t.T.t.v
4A0  A2 83 74 9D BE 00 94 FB 9A BF 84 AA B8 41 BA 13   ".t.>..{.?.*8A:.
4B0  23 00 74 88 83 B9 21 F1 53 1C AE B9 25 F1 37 52   #.t..9!qS..9%q7R
4C0  CA 23 0C AE B9 21 F1 53 FE A1 B9 25 F1 72 D3 23   J#..9!qS~!9%qrS#
4D0  01 84 D5 23 02 4E AE F1 92 DE 23 80 84 E4 23 FC   ..U#.N.q.^#..d#!
4E0  5E AE 23 40 4E AE 54 2B B9 3E F1 F2 FB B9 21 F1   ^.#@N.T+9>qr{9!q
4F0  12 F6 23 10 84 F8 23 1C 37 5E AE FE E7 53 1E 39   .v#..x#.7^.~gS.9
500  89 01 99 FE FE 77 77 77 53 1E 39 8A 10 9A EF 83   ...~~wwwS.9...o.
510  BC 00 BE 00 B4 D2 B4 CD D4 14 85 BC 01 BE 10 B4   <.>.4R4MT..<.>.4
520  D2 D4 14 BC 02 BE 08 B4 D2 D4 14 BC 03 BE 02 B4   RT.<.>.4RT.<.>.4
530  D2 D4 14 BE 00 B4 D2 9A EF 95 BC 04 BE 02 B4 CD   RT.>.4R.o.<.>.4M
540  D4 14 BC 05 BE 04 B4 CD D4 14 BC 06 BE 08 B4 CD   T.<.>.4MT.<.>.4M
550  D4 14 BC 07 BE 10 B4 CD D4 14 74 2D BC 08 BE 00   T.<.>.4MT.t-<.>.
560  B4 D2 B4 CD D4 14 74 29 BC 09 BE 00 D4 14 BC 0A   4R4MT.t)<.>.T.<.
570  BE 00 D4 14 BC 00 BE 00 B4 C7 B4 82 36 80 A4 7C   >.T.<.>.4G4.6.$|
580  84 A2 BD 00 85 74 29 B4 D7 C6 85 BC 05 92 AC BC   ."=..t)4WF.<..,<
590  06 B2 AC BC 04 72 AC BC 03 52 AC BC 02 32 AC BC   .2,<.r,<.R,<.2,<
5A0  01 12 A5 A4 85 FD 96 C6 BD FF A4 AE BD 00 BE 00   ..%$.}.F=.$.=.>.
5B0  B4 C7 BE 0A B4 D7 37 B2 BD 74 2D A4 B4 37 53 3F   4G>.4W72=t-$47S?
5C0  96 B2 EE B4 A4 85 83 FC 14 95 89 E0 83 FE 39 89   .2n4$..!...`.~9.
5D0  01 83 FE 39 8A 10 83 B9 03 08 37 53 3F 96 E2 E9   ..~9...9..7S?.bi
5E0  D9 83 AA B8 00 B9 40 08 37 53 3F C6 EE 18 E9 E7   Y.*8.9@.7S?Fn.ig
5F0  F8 53 E0 96 F8 23 00 83 FA 83 00 00 00 00 00 00   xS`.x#..z.......
600  00 00 00 00 00 00 00 00 00 00 00 00 00 00 00 00   ................
610  00 00 00 00 99 FE 9A EF B4 C7 BD 23 BF FF B4 D7   .....~.o4G=#?.4W
620  B2 28 EF 1E ED 1C C4 4E B4 D7 B2 28 B4 D7 12 36   2(o.m.DN4W2(4W.6
630  32 42 B2 4A C4 2C 99 1F B6 3E B4 D2 C4 2C B4 CD   2B2JD,..6>4RD,4M
640  C4 2C 99 FE 9A EF B4 C7 C4 2C B4 D7 B2 4A 99 FE   D,.~.o4GD,4W2J.~
650  9A EF 99 1F 83 00 00 00 00 00 00 00 00 00 00 00   .o..............
660  00 00 00 00 00 00 00 00 00 00 00 00 00 00 00 00   ................
670  00 00 00 00 00 00 00 00 00 00 00 00 00 00 00 00   ................
680  00 00 00 00 00 00 00 00 00 00 00 00 00 00 00 00   ................
```

```
690  00 00 00 00 00 00 00 00 00 00 00 00 00 00 00 00  ................
6A0  00 00 00 00 00 00 00 00 00 00 00 00 00 00 00 00  ................
6B0  00 00 00 00 00 00 00 00 00 00 00 00 00 00 00 00  ................
6C0  00 00 00 00 00 00 00 00 00 00 00 00 00 00 00 00  ................
6D0  00 00 00 00 00 00 00 00 00 00 00 00 00 00 00 00  ................
6E0  00 00 00 00 00 00 00 00 00 00 00 00 00 00 00 00  ................
6F0  00 00 00 00 00 00 00 00 00 00 00 00 00 00 00 00  ................
700  00 00 00 00 00 00 00 00 00 00 00 00 00 00 00 00  ................
710  00 00 00 00 00 00 00 00 00 00 00 00 00 00 00 00  ................
720  00 00 00 00 00 00 00 00 00 00 00 00 00 00 00 00  ................
730  00 00 00 00 00 00 00 00 00 00 00 00 00 00 00 00  ................
740  00 00 00 00 00 00 00 00 00 00 00 00 00 00 00 00  ................
750  00 00 00 00 00 00 00 00 00 00 00 00 00 00 00 00  ................
760  00 00 00 00 00 00 00 00 00 00 00 00 00 00 00 00  ................
770  00 00 00 00 00 00 00 00 00 00 00 00 00 00 00 00  ................
780  00 00 00 00 00 00 00 00 00 00 00 00 00 00 00 00  ................
790  00 00 00 00 00 00 00 00 00 00 00 00 00 00 00 00  ................
7A0  00 00 00 00 00 00 00 00 00 00 00 00 00 00 00 00  ................
7B0  00 00 00 00 00 00 00 00 00 00 00 00 00 00 00 00  ................
7C0  00 00 00 00 00 00 00 00 00 00 00 00 00 00 00 00  ................
7D0  00 00 00 00 00 00 00 00 00 00 00 00 00 00 00 00  ................
7E0  00 00 00 00 00 00 00 00 00 00 00 00 00 00 00 00  ................
7F0  00 00 00 00 00 00 00 00 00 00 00 00 00 00 00 00  ................
```

The invention claimed is:

1. Apparatus for precision tensioning of threaded fasteners and the like in critical assemblies, said apparatus comprising:

means for applying turning torque to a threaded fastener, including means for measuring torque applied to said fastener and providing a torque signal as a function thereof, and means for measuring angle of rotation of said fastener and providing an angle signal as a function thereof, and torque/angle indicating means including means for receiving and integrating said angle signal to accumulate total angle of rotation, means for selectively resetting said accumulation to zero, means for receiving said torque signal, means for selectively displaying torque applied to said fastener as a function of said torque signal, and means for selectively displaying angle of rotation of said fastener as a function of said accumulation.

2. The apparatus set forth in claim 1 further comprising means for supplying battery power to said indicating means, and a cable including means for connecting said battery power to said torque-measuring and said angle-measuring means.

3. The apparatus set forth in claim 2 wherein said indicating means further comprises means for measuring and indicating low battery power at said display.

4. The apparatus set forth in claim 1 further comprising a two-section housing, one said section being affixed to said torque-applying means and the other rotatable with respect thereto, and wherein said angle-measuring means comprises an optical encoder including an encoder wheel carried by one of said sections and optical detector means carried by the other of said sections.

5. The apparatus set forth in claim 4 wherein said encoder wheel comprises an annular band axially surrounding a central axis or said torque-applying means, said band having alternating translucent and opaque zones at predetermined angular increments surrounding said axis.

6. The apparatus set forth in claim 5 wherein said optical detector means comprises first and second optical detectors spaced from each other circumferentially of said axis by the angle Ni/2, where N is an odd integer and i is one of said angular increments.

7. The apparatus set forth in claim 4 wherein said torque-applying means further comprises means for coupling said other housing section to structure into which said fastener is driven to establish a reference for said angle-measuring means.

8. The apparatus set forth in claim 7 wherein said reference-establishing means comprises a clip, a flexible cable extending from said clip, an eye on said other section telescopically receiving said flexible cable, and a setscrew extending into said eye.

9. The apparatus set forth in claim 1 wherein said torque-displaying means and said angle-displaying means comprise a single alphanumeric display; and wherein said apparatus further comprises means for selecting between separate torque and angle modes of operation, and means for controlling said display as a function of said modes of operation.

10. The apparatus set forth in claim 9 further comprising means for selecting torque display in said torque mode of operation in either foot-pounds or Newton-meters.

11. The apparatus set forth in claim 1 wherein said indicating means further comprises means for establishing a torque threshold, means for comparing said torque signal to said threshold, and means for indicating when said torque signal equals said threshold.

12. The apparatus set forth in claim 11 further comprising means for selecting separate measurement and setup modes of operation, means for displaying said torque threshold at said display in said setup mode of operation, and means for selectively varying said threshold in said setup mode of operation.

13. The apparatus set forth in claim 12 wherein said selectively-varying means comprises means for selectively stepwise incrementing and decrementing said threshold in said setup mode of operation.

14. The apparatus set forth in claim 1 wherein said indicating means further comprise means for establishing an angle threshold, means for comparing said accumulation to said threshold, and means for indicating when said accumulation equals said threshold.

15. The apparatus set forth in claim 14 further comprising means for selecting separate measurement and setup modes of operation, means for displaying said angle threshold at said display in said setup mode of operation, and means for selectively varying said threshold in said setup mode of operation.

16. The apparatus set forth in claim 15 wherein said selectively-varying means comprises means for selectively stepwise incrementing and decrementing said threshold in said setup mode of operation.

17. Apparatus for precision tensioning of threaded fasteners and the like in critical assembly operations, said apparatus comprising:

means for applying turning torque to a threaded fastener, including means for measuring torque applied to said fastener and providing a torque signal as a function thereof, and means for measuring angle of rotation of said fastener and providing an angle signal as a function thereof, means for establishing selected torque and angle thresholds, means operable in a torque-measurement mode of operation, for comparing said torque signal to said torque threshold, means operable in an angle-measurement mode of operation for comparing said angle signal to said angle threshold, means for indicating when one of said signals equals the corresponding said threshold, and means for selecting said torque-measurement and angle-measurement modes of operation.

18. The apparatus set forth in claim 17 further comprising means for displaying torque applied to said fastener and angle of rotation of said fastener as respective functions of said torque and angle signals.

19. The apparatus set forth in claim 18 wherein said displaying means includes means for integrating said angle signal to accumulate total angle of rotation, and means for selectively resetting said accumulation to zero.

20. The apparatus set forth in claim 19 wherein said displaying means comprises means for displaying torque applied to said fastener and accumulated angle of rotation of said fastener in respective ones of said torque and angle modes of operation.

21. Apparatus for precision tensioning of threaded fasteners and the like comprising:

a drive head including means for applying turning torque to a threaded fastener, strain gage means mounted on said torque-applying means for providing a torque signal as a function of torque applied to said fastener, and means for measuring angle of rotation of said fastener and providing an angle signal as a function thereof, indicating means including microprocessor-based control means, means for establishing selected signal thresholds within said control means, means within said control means for comparing said torque and angle signals to said thresholds, means for indicating when one of said torque and angle signals equals a corresponding said threshold, and means responsive to said control means for displaying torque applied to said fastener and angle of rotation of said fastener as respective functions of said torque and angle signals, and a multiconductor cable coupling said drive head to said indicating means for feeding said torque and angle signals to said comparing means, said control means including means for integrating said angle signal to accumulate total angle of rotation, said indicating means including first means for selectively resetting said accumulation to zero, and said drive head including second means coupled to said control means through said cable for selectively resetting said accumulation to zero independently of said first means.

22. Apparatus for precision tensioning of threaded fasteners and the like comprising:

a drive head including means for applying turning torque to a threaded fastener, strain gage means mounted on said torque-applying means for providing a torque signal as a function of torque applied to said fastener, and means for measuring angle of rotation of said fastener and providing an angle signal as a function thereof, indicating means including microprocessor-based control means, means for establishing selected signal thresholds within said control means, means within said control means for comparing said torque and angle signals to said thresholds, means for indicating when one of said torque and angle signals equals a corresponding said threshold, and means responsive to said control means for displaying torque applied to said fastener and angle of rotation of said fastener as respective functions of said torque and angle signals, and a multiconductor cable coupling said drive head to said indicating means for feeding said torque and angle signals to said comparing means, said control means including means for integrating said angle signal to accumulate total angle of rotation, and said indicating means including first means for selectively resetting said accumulation to zero, said comparing means comprising means for comparing said torque and angle signals to said thresholds in respective torque and angle modes of operation, said display means comprising means for displaying torque applied to said fastener and accumulated angle of rotation of said fastener in respective torque and angle modes of operation, and said indicating means further comprising means coupled to said control means for selecting said torque and angle modes of operation.

23. The apparatus set forth in claim 22 wherein said drive head includes second means coupled to said control means through said cable for selectively resetting said accumulation to zero independently of said first means.

24. The apparatus set forth in claim 22 wherein said indicating means further comprises means coupled to said control means for selecting separate measurement and setup modes of operation, said display means being responsive to said control means in said setup mode of operation for displaying torque and angle thresholds as a function of said torque/angle mode-select means.

25. The apparatus set forth in claim 24 wherein said threshold-establishing means comprises means for selectively varying said thresholds in said setup mode of operation.

26. The apparatus set forth in claim 25 wherein said selectively-varying means comprises means coupled to said control means for selectively incrementing and decrementing one of said thresholds as a function of said torque/angle mode-select means.

27. The apparatus set forth in claim 26 wherein said indicating means comprises an electronics enclosure having an operator panel, said display means comprising an alphanumeric display carried by said panel, said first means, said torque/angle mode-select means, said measurement/setup mode-select means, said incrementing means and said decrementing means comprising respective switch means carried on said panel.

28. The apparatus set forth in claim 27 comprising further switch means carried on said panel for selecting torque display in said torque mode of operation in either foot-pounds or Newton-meters.

29. The apparatus set forth in claim 28 wherein said display means includes means for indicating torque and angle modes of operation, measurement and setup modes of operation, and foot-pounds and Newton-meters torque display.

30. The apparatus set forth in claim 27 further comprising means establishing a second torque threshold, and means for comparing said torque signal to said second threshold and indicating an alarm condition in any mode of operation when said torque signal equals said second threshold.

31. The apparatus set forth in claim 27 wherein said indicating means includes an audible alarm.

32. Apparatus for precision tensioning of threaded fasteners and the like comprising:

a drive head including means for applying turning torque to a threaded fastener, strain gage means mounted on said torque-applying means for providing a torque signal as a function of torque applied to said fastener, and means for measuring angle of rotation of said fastener and providing an angle signal as a function thereof, indicating means including microprocessor-based control means, means for establishing selected signal thresholds within said control means, means within said control means for comparing said torque and angle signals to said thresholds, means for indicating when one of said torque and angle signals equals a corresponding said threshold, and a multiconductor cable coupling said drive head to said indicating means for feeding said torque and angle signals to said comparing means, said drive head comprising a two-section housing, one said section being affixed to said torque-applying means and the other being rotatable with respect thereto, said angle-measuring means comprising an optical encoder including an annular band carried by one of said sections axially surrounding a central axis of said torque-applying means, said band alternating translucent and opaque zones at predetermined angular increments surrounding said axis, and first and second optical detectors carried by the other of said sections spaced from each other circumferentially of said axis by the angle Ni/2, where N is an odd integer and i is one of said angular increments.

33. The apparatus set forth in claim 32 wherein said angular increments are one degree increments.

34. The apparatus set forth in claim 32 wherein said control means includes means responsive to said first and second optical detectors for determining direction of rotation of said torque-applying means.

35. Apparatus for precision tensioning of threaded fasteners and the like comprising:

a drive head including means for applying turning torque to a threaded fastener, strain gage means mounted on said torque-applying means for providing a torque signal as a function of torque applied to said fastener, and means for measuring angle of rotation of said fastener and providing an angle signal as a function thereof, indicating means including microprocessor-based control means, means for establishing selected signal thresholds within said control means, means within said control means for comparing said torque and angle signals to said thresholds, means for indicating when one of said torque and angle signals equals a corresponding said threshold, and a multiconductor cable coupling said drive head to said indicating means for feeding said torque and angle signals to said comparing means, said drive head comprising a two-section housing, one said section being affixed to said torque-applying means and the other being rotatable with respect thereto, a clip, a flexible cable extending from said clip, an eye on said other section telescopically receiving said flexible cable, and a setscrew extending into said eye for coupling said other housing section to structure into which said fastener is driven to establish a reference for said angle-measuring means, and said angle-measuring means comprising an optical encoder including an encoder wheel carried by one of said sections and optical detector means carried by the other of said sections.

* * * * *